July 21, 1925.  
J. J. SCHILLER  
1,546,944
VARIABLE SPEED TRANSMISSION
Filed May 10, 1922     2 Sheets-Sheet 2
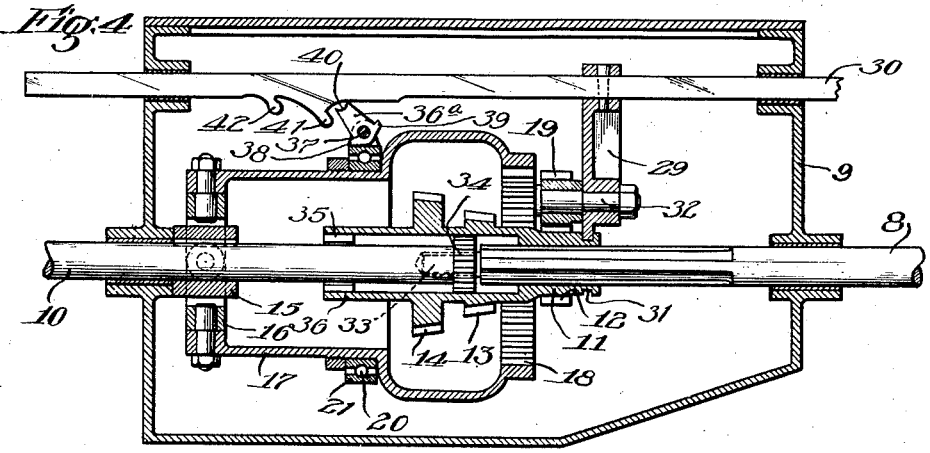
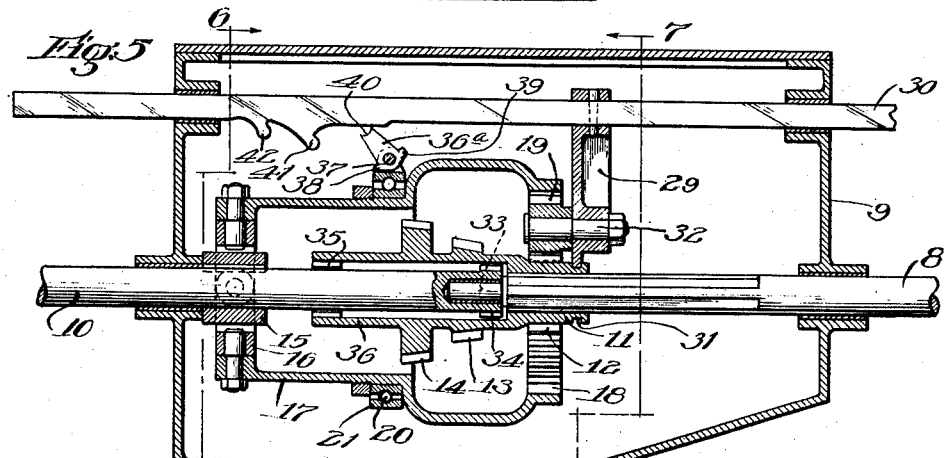
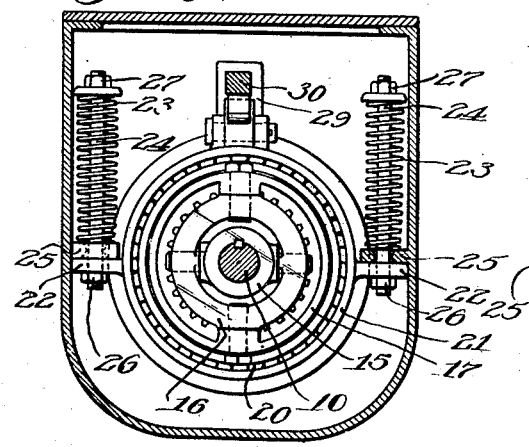 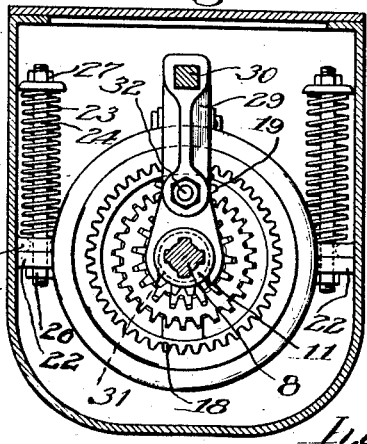

Patented July 21, 1925.

1,546,944

UNITED STATES PATENT OFFICE.

JOHN J. SCHILLER, OF BERWYN, ILLINOIS.

VARIABLE-SPEED TRANSMISSION.

Application filed May 10, 1922. Serial No. 559,747.

*To all whom it may concern:*

Be it known that I, JOHN J. SCHILLER, a citizen of the United States, and a resident of Berwyn, in the county of Cook and State of Illinois, have invented certain new and useful Improvements in Variable-Speed Transmissions, of which the following is a full, clear, and exact description.

The invention relates to variable speed transmissions and its object is to provide gearing for this purpose which is simple in construction, employs a minimum number of gears and which is efficient in operation.

The invention consists in the several novel features hereinafter set forth and more particularly defined by claims at the conclusion hereof.

Figure 1:
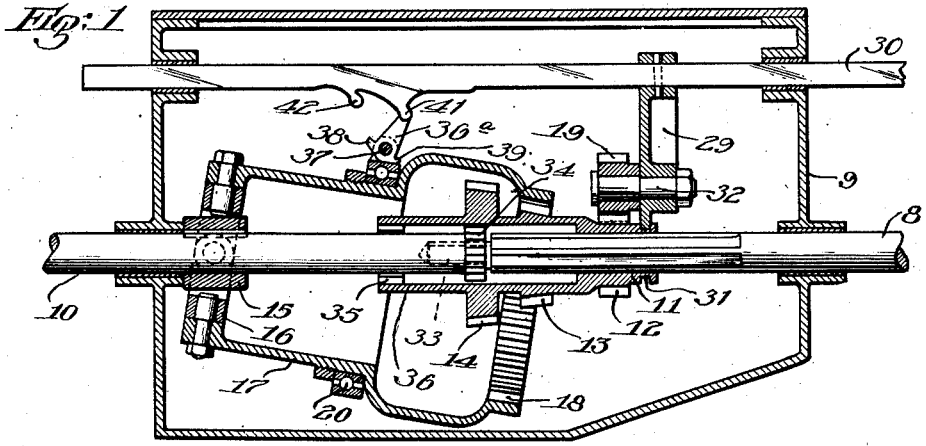
Figure 2:
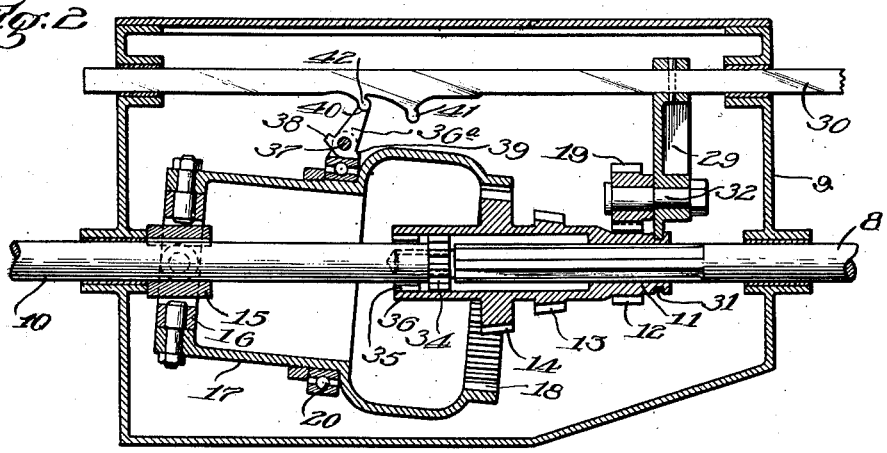
Figure 3:
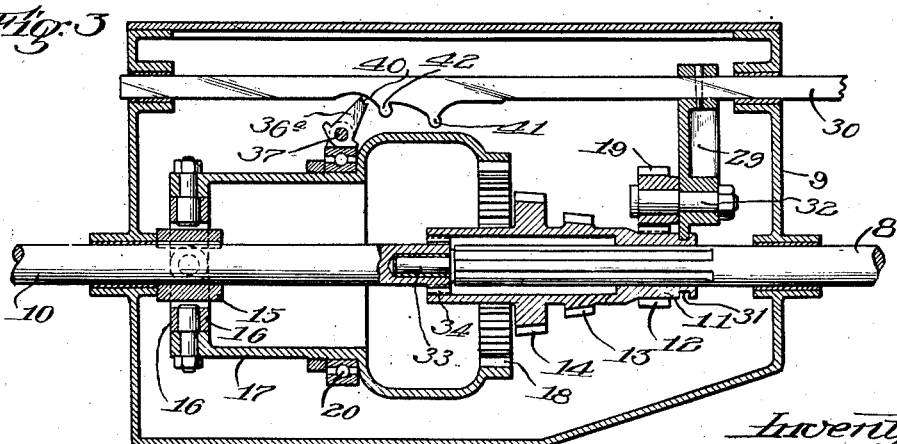

In the drawings: Fig. 1 is a longitudinal section of mechanism embodying the invention, the parts being shown in position for driving the driven shaft at low speed. Fig. 2 is a similar view with the gearing set to drive the driven shaft at intermediate speed. Fig. 3 is a similar view with the gearing set to drive the driven shaft at high speed. Fig. 4 is a similar view showing the gearing in neutral position. Fig. 5 is a similar view showing the gearing set to drive the driven shaft in reverse direction. Fig. 6 is a section on line 6—6 of Fig. 5. Fig. 7 is a section on line 7—7 of Fig. 5.

The invention is exemplified in mechanism adapted to operate a driven shaft at low, intermediate and high speeds in one direction and at one speed in reverse direction. A drive-shaft 8 extends through one end of the gear-case 9 to operate a coaxial driven shaft 10 which extends through the other end of the gear-case to the point where its power is to be applied. Case 9 is adapted to contain lubricant so that all of the gearing may run in oil. A sleeve 11 is splined to the inner end of shaft 8 so that it will be slidable longitudinally on the shaft and will rotate therewith. A reverse pinion 12, a low speed pinion 13 and an intermediate speed pinion 14 are all integrally formed or secured to constantly rotate with the sleeve 11. A collar 15 is keyed to the driven shaft 10 and is connected by a universal joint 16 to a pivotally adjustable and rotatable hollow member 17 which carries, at its inner end, an internal gear 18 which is adapted to mesh with the low and intermediate speed pinions or a reverse idler 19 which meshes with and is driven by the reverse pinion 12. The gear-carrying member 17 is rotatably supported by a ball-bearing 20 which comprises a supporting ring 21 which is held against lateral movement in the case and is movable vertically therein. For this purpose, lugs 22 formed on the ring 21 are confined against lateral movement in the case. Member 17 is yieldingly held in position so its axis of rotation will be in a plane which is vertical to the axis of the shafts 8 and 10, by springs 23 on rods 24 which extend through lugs 22 and guide lugs 25 integral with the case and are provided with nuts 26 at their lower ends and nuts 27 at their upper ends. The springs permit vertical pivotal adjustment of the gear-carrying member 17 so that gear 18 may be brought into mesh with either of the pinions 13, 14 or reverse idler 19 or into neutral position which is parallel with the axes of shafts 8 and 10 and also yieldingly hold said member in neutral position. The pinions on the sleeve 11 and idler pinion 19 are conjointly shiftable by a fork 29 which is fixed to a controller rod 30 which is longitudinally slidable in the case and extends into a groove 31 and carries a stud 32 on which the idler 19 is journalled. The sleeve is thus shiftable to bring the reverse idler 19, low speed pinion 13 or an intermediate speed pinion into position to be engaged by the internal gear 18 when the latter is shifted transversely to the axes of the pinions to bring them into mesh with any one of them. A reduced end 33 on the drive-shaft 8 extends into a socket in the contiguous end of the driven shaft 10 to retain them in alignment. Keys or teeth 34 are provided on the inner end of the driven shaft 10 and are adapted to engage internal teeth 35 in the end of the hub 36 in the inner end of the sleeve 11 so that, when the sleeve is shifted longitudinally on the drive-shaft 8 to bring the teeth 34, 35 in connected relation, the driven shaft will be operated at the same speed as the drive shaft, that is high speed, and directly from the drive-shaft 8.

The operation of this gearing will be as follows: When the parts are in the position shown in Fig. 4, the driven shaft 10 and the internal gear 18 will be idle, because the latter will be disengaged from all of the gears driven by the shaft 8. To drive the shaft 10 at low speed, the sleeve 11 will be shifted forwardly so that it will be transversely aligned with the internal gear 18 and the latter will be pivotally shifted to bring one of its sides into mesh with pinion 13, as shown in Fig. 1. Whereupon, the driven shaft 10 will be driven at a low speed through pinion 13, gear 18, member 17 and universal joint 16. To drive the shaft at intermediate speed, the sleeve 11 will be shifted forwardly an additional step to bring gear 14 into transverse alignment with internal gear 18 and the latter will be pivotally shifted to bring its teeth into mesh with said pinion, as shown in Fig. 2. Whereupon, the driven shaft 10 will be operated at intermediate speed through pinion 14, internal gear 18, carrying-member 17 and universal joint 16. To drive the shaft 10 at high speed, the sleeve 11 will be shifted forwardly another step so that the teeth 35 in sleeve 11 will slide into operative relation with the teeth 34 on the inner end of the driven shaft 9 and the gear 18 will be out of engagement with all of the driving pinions, as shown in Fig. 3, whereupon, the shaft 10 will be driven directly from shaft 8 through sleeve 11 and teeth 35 and 34 at high speed. When the shaft 10 is to be driven in reverse direction, the sleeve 10 will be shifted one step rearwardly of its neutral position, so as to bring the reverse idler 19 into mesh with the internal gear 18, whereupon, shaft 10 will be driven in reverse direction through pinion 12, idler 19, gear 18, carrying-member 17 and universal joint 16.

Mechanism is provided for conjointly controlling the longitudinal movement of sleeve 11 and the pivotal movement of the gear-carrying member 17 in connection with the controller rod 30 and comprises a dog 36ª which is pivoted, at 37, to the upper portion of the bearing-ring 21 and is provided with stops 38 and 39 to limit its pivotal movement in opposite directions. The upper end of the dog is recessed or notched, as at 40, to form a seat for either of the abutments 41, 42 on the rod 30. In neutral position (Fig. 4), the dog will be disengaged from abutments 41 and 42, so that springs 23 will be effective to raise the gear-carrier 17 into its normal position. When the controller rod 30 is shifted longitudinally in one direction sufficiently to bring the low speed pinion 13 in position to be engaged by gear 18 (Fig. 1), abutment 41 will have entered the notch 40 in the dog 46ª and will have shifted the dog sufficiently to swing the carrier downwardly against the force of springs 22 to bring gear 18 into mesh with pinion 13. When the rod 30 is shifted further in the same direction (Fig. 2) to bring pinion 14 into position to be engaged by gear 18, the dog 36ª will be engaged by abutment 42 to pivotally shift the carrier-member the correct distance to bring gear 18 into mesh with the intermediate pinion 14.

During these shifts, the springs 23 will permit the member 19 to yield downwardly to permit the abutments 41 and 42 to seat themselves in the recess in the end of the dog and the stop 39 will limit pivotal movement of the dog in one direction, so that it will be operative to hold member 17 depressed against the force of springs 23. To drive the shaft 10 at high speed, the controller rod 30 will be shifted further in the same direction to bring gear-teeth 35 on sleeve 11 into driving relation with gear 34 on shaft 10, as shown in Fig. 3. As the controller rod is thus shifted, lug 42 will pass out of notch 40 in the dog 36ª to release the carrying member 17 and permit it to be held in its normal position by springs 23. This controlling mechanism permits the gearing to be stepped from low to intermediate to high speeds. When shifting from a higher to a lower speed, the dog 36ª will be shifted to the left to render it inoperative until the controller rod has been shifted to its neutral position (Fig. 4), at which time stop 38 will be effective to limit the pivotal movement of the dog. To render the reverse gearing active, the controller rod 30 is shifted into position shown in Fig. 5, at which time the member 17 is in its normal position and the idler 19 will mesh with internal teeth 18 on the member 17.

Although the controlling mechanism has been specifically described, it will be understood that any suitable controlling mechanism may be adopted in lieu thereof.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In variable speed transmissions, the combination of a drive shaft, a shaft to be driven coaxial with said drive shaft, an internal gear, a universal joint between and connecting said gear and one of said shafts, a sleeve lapping and extending around both of said shafts and adapted to rotate with the other of said shafts, an external gear on said sleeve, means between said sleeve and the said one shaft for directly connecting the shafts to rotate together, and means for shifting the said internal gear into and out of mesh with the external gear.

2. In variable speed transmissions, the combination of a drive shaft, a shaft to be driven coaxial with said drive shaft, an internal gear, a universal joint between and connecting said gear and one of said shafts, a sleeve lapping and extending around both of said shafts and adapted to rotate with the other of said shafts, an external gear on said sleeve, gearing between said sleeve and the said one shaft for directly connecting the shafts to rotate together, and means for shifting the said internal gear into and out of mesh with the external gear.

3. In variable speed transmissions, the combination of a drive shaft, a shaft to be driven coaxially with said drive shaft, a gear, a universal joint between and connecting said gear and one of said shafts, a plurality of gears of different diameters rotatable with said other shaft, and means for pivotally shifting said first mentioned gear and bringing it into mesh with any of the plurality of gears.

4. In variable speed transmissions, the combination of a drive shaft, a shaft to be driven coaxially with said drift shaft, an internal gear, a universal joint between said internal gear and one of the shafts, a plurality of gears of different sizes rotatable with the other shaft and movable bodily into alignment with the internal gear, and means for pivotally shifting the internal gear and bodily shifting the other gears to bring the internal gear into engagement with either of the other gears.

5. In variable speed transmissions, the combination of a drive shaft, a shaft to be driven coaxially with the drive shaft, an internal gear, a universal joint between and connecting said gear and one of said shafts, a plurality of gears of different sizes rotatable with the other shaft and bodily movable thereon, and means for pivotally shifting the internal gear and bodily shifting the other gears to bring the internal gear into and out of engagement with any of the other gears.

6. In variable speed transmissions, the combination of a drive shaft, a shaft to be driven coaxially with said drive shaft, an internal gear, a universal joint between and connecting said internal gear and one of said shafts, an external gear rotating with the other shaft, an external reverse gear, means for directly connecting the shafts, and means for relatively shifting said gears to bring the internal gear into mesh with any of the other gears.

7. In variable speed transmissions, the combination of a case, a drive shaft extending into the case, a shaft to be driven coaxially with said drive shaft also extending into the case, an internal gear, a universally driving joint between and connecting the internal gear and the driven shaft, a plurality of gears of different sizes slidably mounted on the drive shaft, and means for pivotally shifting the internal gear and for bodily shifting the other gears to bring the internal gear into position to be driven by any of the other gears.

8. In variable speed transmissions, the combination of a case, a drive shaft extending into the case, a shaft to be driven coaxially with said drive shaft also extending into the case, an internal gear, a universally driving joint between and connecting the internal gear and the driven shaft, a plurality of gears of different sizes slidably mounted on the drive shaft, a reverse gear driven by the drive shaft, and means for pivotally shifting the internal gear and for bodily shifting the other gears to bring the internal gear into position to be driven by any of the other gears.

9. In variable speed transmissions, the combination of a case, a drive shaft extending into the case, a shaft to be driven coaxially with said drive shaft also extending into the case, an internal gear, a universally driving joint between and connecting the internal gear and the driven shaft, a plurality of gears of different sizes slidably mounted on the drive shaft, means for directly connecting said shafts, and means for pivotally shifting the internal gear and for bodily shifting the other gears to bring the internal gear into position to be driven by any of the other gears.

10. In variable speed transmissions, the combination of a case, a drive shaft extending into the case, a shaft to be driven coaxially with said drive shaft also extending into the case, an internal gear, a universally driving joint between and connecting the internal gear and the driven shaft, a plurality of gears of different sizes slidably mounted on the drive shaft, means for directly connecting said shafts, a reverse gear operated by the drive shaft, and means for pivotally shifting the internal gear and for bodily shifting the other gears to bring the internal gear into position to be driven by any of the other gears.

11. In variable speed transmissions, the combination of a drive shaft, a shaft to be driven coaxial with said drive shaft, an internal gear, a universal joint between and connecting said internal gear and one of said shafts, means for retaining said internal gear in a position so that its axis of rotation will be in a plane vertical to the axes of said shafts, a plurality of gears of different sizes rotatable with the other shaft and movable bodily into alignment with the internal gear, and means for effecting relative pivotal and bodily shift of said gears to bring the internal gear into engagement with either of the other gears.

12. In variable speed transmissions, the combination of a drive shaft, a shaft to be driven coaxial with said drive shaft, an internal gear, a universal joint between and connecting said internal gear and one of said shafts, means for retaining said internal gear in a position so that its axis of rotation will be in a plane vertical to the axes of said shafts, an external gear rotating with the other shaft, an external reverse gear, and means for relatively shifting said gears to bring the internal gear into mesh with any of the other gears.

JOHN J. SCHILLER.